(12) United States Patent
Tsukiyama

(10) Patent No.: US 10,574,093 B2
(45) Date of Patent: Feb. 25, 2020

(54) POWER FEEDING APPARATUS AND POWER FEEDING SYSTEM

(71) Applicant: DAIHEN Corporation, Osaka (JP)

(72) Inventor: Daisuke Tsukiyama, Osaka (JP)

(73) Assignee: DAIHEN Corporation, Osaka-shi, Osaka (JP)

( * ) Notice: Subject to any disclaimer, the term of this patent is extended or adjusted under 35 U.S.C. 154(b) by 204 days.

(21) Appl. No.: 15/794,472

(22) Filed: Oct. 26, 2017

(65) Prior Publication Data

US 2018/0123397 A1    May 3, 2018

(30) Foreign Application Priority Data

Oct. 31, 2016 (JP) ................... 2016-213206

(51) Int. Cl.
*H02J 50/12* (2016.01)
*H02M 7/44* (2006.01)

(52) U.S. Cl.
CPC ............. *H02J 50/12* (2016.02); *H02M 7/44* (2013.01)

(58) Field of Classification Search
CPC .................. H02J 50/12; H02M 7/44
See application file for complete search history.

(56) References Cited

U.S. PATENT DOCUMENTS

| 9,384,885 B2 * | 7/2016 | Karalis ............... B60L 53/12 |
| 9,472,973 B2 | 10/2016 | Nakagawa et al. | |
| 9,796,281 B2 * | 10/2017 | Park .................. B60L 11/182 |
| 9,837,826 B2 * | 12/2017 | Park .................. H02J 50/12 |
| 2010/0270867 A1 * | 10/2010 | Abe .................. H02J 7/025 307/104 |
| 2012/0161536 A1 * | 6/2012 | Kamata ............... H02J 50/80 307/104 |

(Continued)

FOREIGN PATENT DOCUMENTS

| EP | 2346141 A1 | 7/2011 |
| JP | H07-336609 A | 12/1995 |
| JP | 2011-199949 A | 10/2011 |

OTHER PUBLICATIONS

Extended Search Report dated Dec. 11, 2017 in EP Application No. 17197973.5.

*Primary Examiner* — Jared Fureman
*Assistant Examiner* — Michael J Warmflash
(74) *Attorney, Agent, or Firm* — Panitch Schwarze Belisario & Nadel LLP

(57) ABSTRACT

Provided is a power feeding apparatus in a power feeding system that is configured to transmit, in a contactless fashion, electric power from the power feeding apparatus to a power receiving apparatus by magnetic coupling. The power feeding apparatus includes a power feeding resonator, a power supply, a communicator, and a controller. The power supply is configured to output a high-frequency signal to the power feeding resonator. The communicator is configured to receive load information from the power receiving apparatus. The load information includes information on at least a voltage between the voltage and a current of a load coupled to the power receiving apparatus. The controller is configured to perform, on the power supply, a control of the high-frequency signal on a basis of the load information received by the communicator, after starting of the output of the high-frequency signal by the power supply.

8 Claims, 10 Drawing Sheets

(56) References Cited

U.S. PATENT DOCUMENTS

| | | |
|---|---|---|
| 2013/0033118 A1 | 2/2013 | Karalis et al. |
| 2014/0084701 A1* | 3/2014 | Bae .................. H02J 5/005 |
| | | 307/104 |
| 2014/0375256 A1 | 12/2014 | Lee et al. |
| 2015/0042169 A1 | 2/2015 | Park et al. |
| 2015/0042173 A1 | 2/2015 | Lee et al. |
| 2015/0076921 A1 | 3/2015 | Park et al. |
| 2015/0115730 A1* | 4/2015 | Kanno ................ H02J 5/005 |
| | | 307/104 |
| 2016/0141882 A1 | 5/2016 | Ichikawa |
| 2017/0256958 A1* | 9/2017 | Irish .................. H02J 50/12 |

* cited by examiner

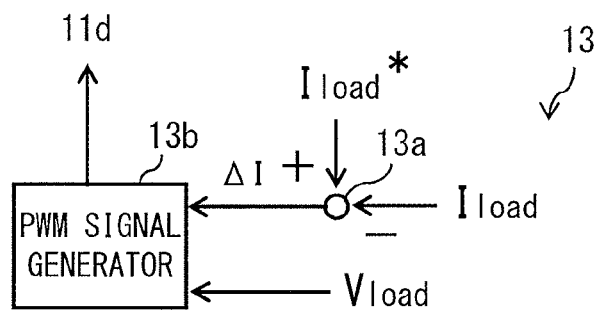
FIG. 2
| X | [ Kp, Ki] |
|---|---|
| $V1 \leq x < V2$ | [ Kp(1), Ki(1)] |
| $V2 \leq x < V3$ | [ Kp(2), Ki(2)] |
| $V3 \leq x < V4$ | [ Kp(3), Ki(3)] |
| $V4 \leq x < V5$ | [ Kp(4), Ki(4)] |
| $V5 \leq x < V6$ | [ Kp(5), Ki(5)] |
| $V6 \leq x$ | [ Kp(6), Ki(6)] |
FIG. 3
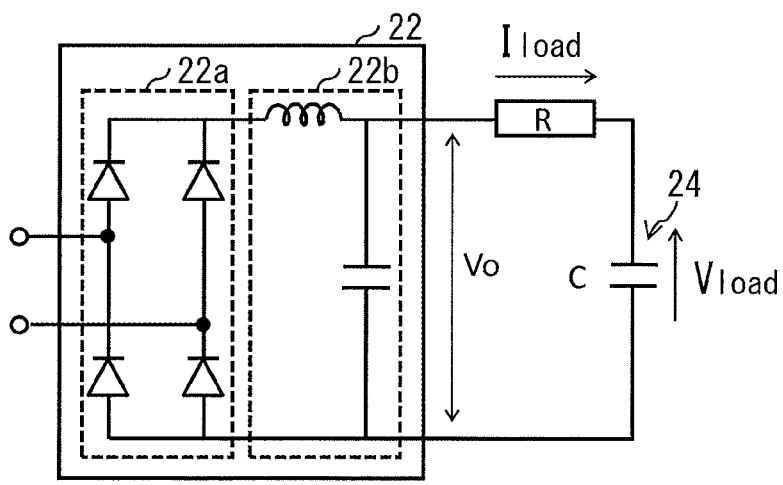
FIG. 4

| X | [ Kp, Ki] |
|---|---|
| D1≦x<D2 | [ Kp(1), Ki(1)] |
| D2≦x<D3 | [ Kp(2), Ki(2)] |
| D3≦x<D4 | [ Kp(3), Ki(3)] |
| D4≦x<D5 | [ Kp(4), Ki(4)] |
| D5≦x<D6 | [ Kp(5), Ki(5)] |
| D6≦x | [ Kp(6), Ki(6)] |

//  # POWER FEEDING APPARATUS AND POWER FEEDING SYSTEM

CROSS REFERENCE TO RELATED APPLICATIONS

This application claims the benefit of Japanese Priority Patent Application JP2016-213206 filed on Oct. 31, 2016, the entire contents of which are incorporated herein by reference.

BACKGROUND

The technology relates to a power feeding apparatus and a power feeding system.

A rush current flows into a device such as a motor and a battery when, for example, a large current is fed to the motor upon its starting, or charging of the battery is started. The occurrence of the rush current may heat the device such as the motor and the battery, and may possibly reduce the device life accordingly. The occurrence of the rush current may also cause a large current to be fed instantaneously to a circuit provided at the periphery of the device such as the motor and the battery, and may possibly lead to a malfunction of an apparatus accordingly. Providing a protection circuit against the rush current increases both design and manufacturing costs as well.

To address those concerns, measures have been proposed that reduce the rush current. For example, a technique disclosed in Japanese Unexamined Patent Application Publication (JP-A) No. H07-336609 causes a resistor to be connected with a circuit only upon the occurrence of the rush current, and otherwise causes the resistor to be disconnected from the circuit. For example, a technique disclosed in JP-A No. 2011-199949 is provided with an inductor that evades the rush current. The inductor is high in resistance to a high-frequency component but is ideally non-resistance to a direct-current component. Use of the inductor is thus advantageous in that a loss is extremely small when the rush current is not generated.

SUMMARY

The techniques disclosed in JP-A No. H07-336609 and No. 2011-199949 both involve an insertion of an electrical circuit component, incurring an increase in size of an apparatus and a rise in cost.

An object of at least one embodiment is to provide a power feeding apparatus and a power feeding system that are able to reduce a rush current while suppressing an increase in size of an apparatus and a rise in cost.

A power feeding apparatus according to one embodiment of the technology is a power feeding apparatus in a power feeding system. The power feeding system is configured to transmit, in a contactless fashion, electric power from the power feeding apparatus to a power receiving apparatus to which a load is to be coupled. The electric power is transmitted by magnetic coupling. The power feeding apparatus includes: a power feeding resonator; a power supply configured to output a high-frequency signal to the power feeding resonator; a communicator configured to receive load information from the power receiving apparatus, in which the load information includes information on at least a voltage between the voltage and a current of the load coupled to the power receiving apparatus; and a controller configured to perform, on the power supply, a control of the high-frequency signal on a basis of the load information received by the communicator, after starting of the output of the high-frequency signal by the power supply.

A power feeding system according to one embodiment of the technology is a power feeding system configured to transmit, in a contactless fashion, electric power by magnetic coupling. The power feeding system includes: a power feeding apparatus configured to transmit the electric power; and a power receiving apparatus to which a load is to be coupled, and configured to receive the electric power transmitted from the power feeding apparatus. The power receiving apparatus includes a power receiving resonator, a detector configured to perform a detection of at least a voltage between the voltage and a current of the load coupled to the power receiving apparatus, and a first communicator configured to transmit a result of the detection performed by the detector to the power feeding apparatus. The power feeding apparatus includes a power feeding resonator, a power supply configured to output a high-frequency signal to the power feeding resonator, a second communicator configured to receive the result of the detection from the first communicator, and a controller configured to perform, on the power supply, a control of the high-frequency signal on a basis of the result of the detection received by the second communicator, after starting of the output of the high-frequency signal by the power supply.

A power feeding apparatus according to one embodiment of the technology is a power feeding apparatus in a power feeding system. The power feeding system is configured to transmit, in a contactless fashion, electric power from the power feeding apparatus to a power receiving apparatus to which a load is to be coupled. The electric power is transmitted by magnetic coupling. The power feeding apparatus includes: a power feeding resonator; a power supply configured to output a high-frequency signal to the power feeding resonator; a communicator configured to receive power-receiving-side information from the power receiving apparatus, in which the power-receiving-side information includes information on a distance and information on a current of the load coupled to the power receiving apparatus, the distance is a distance between the power feeding apparatus and the power receiving apparatus and relates to the magnetic coupling; and a controller configured to perform, on the power supply, a control of the high-frequency signal on a basis of the power-receiving-side information received by the communicator, after starting of the output of the high-frequency signal by the power supply.

A power feeding system according to one embodiment of the technology is a power feeding system configured to transmit, in a contactless fashion, electric power by magnetic coupling. The power feeding system includes: a power feeding apparatus configured to transmit the electric power; and a power receiving apparatus to which a load is to be coupled, and configured to receive the electric power transmitted from the power feeding apparatus. The power receiving apparatus includes a power receiving resonator, a current detector configured to perform a detection of a current of the load coupled to the power receiving apparatus, and a first communicator configured to transmit a result of the detection performed by the current detector to the power feeding apparatus. The power feeding apparatus includes a power feeding resonator, a power supply configured to output a high-frequency signal to the power feeding resonator, a second communicator configured to receive the result of the detection from the first communicator, a distance measuring device configured to measure a distance that is between the power feeding apparatus and the power receiving apparatus and relates to the magnetic coupling, and a controller configured to perform, on the power supply, a control of the high-frequency signal on a basis of the distance obtained by the distance measuring device and the result of the detection received by the second communicator, after starting of the output of the high-frequency signal by the power supply.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 2 illustrates an example of functional blocks of a controller provided in a power feeding apparatus illustrated in FIG. 1.

FIG. 3 illustrates an example of a gain table stored in the controller provided in the power feeding apparatus illustrated in FIG. 1.

FIG. 4 illustrates an example of a circuit configuration of a rectifying-smoothing circuit illustrated in FIG. 1.

DETAILED DESCRIPTION

Figure 1:
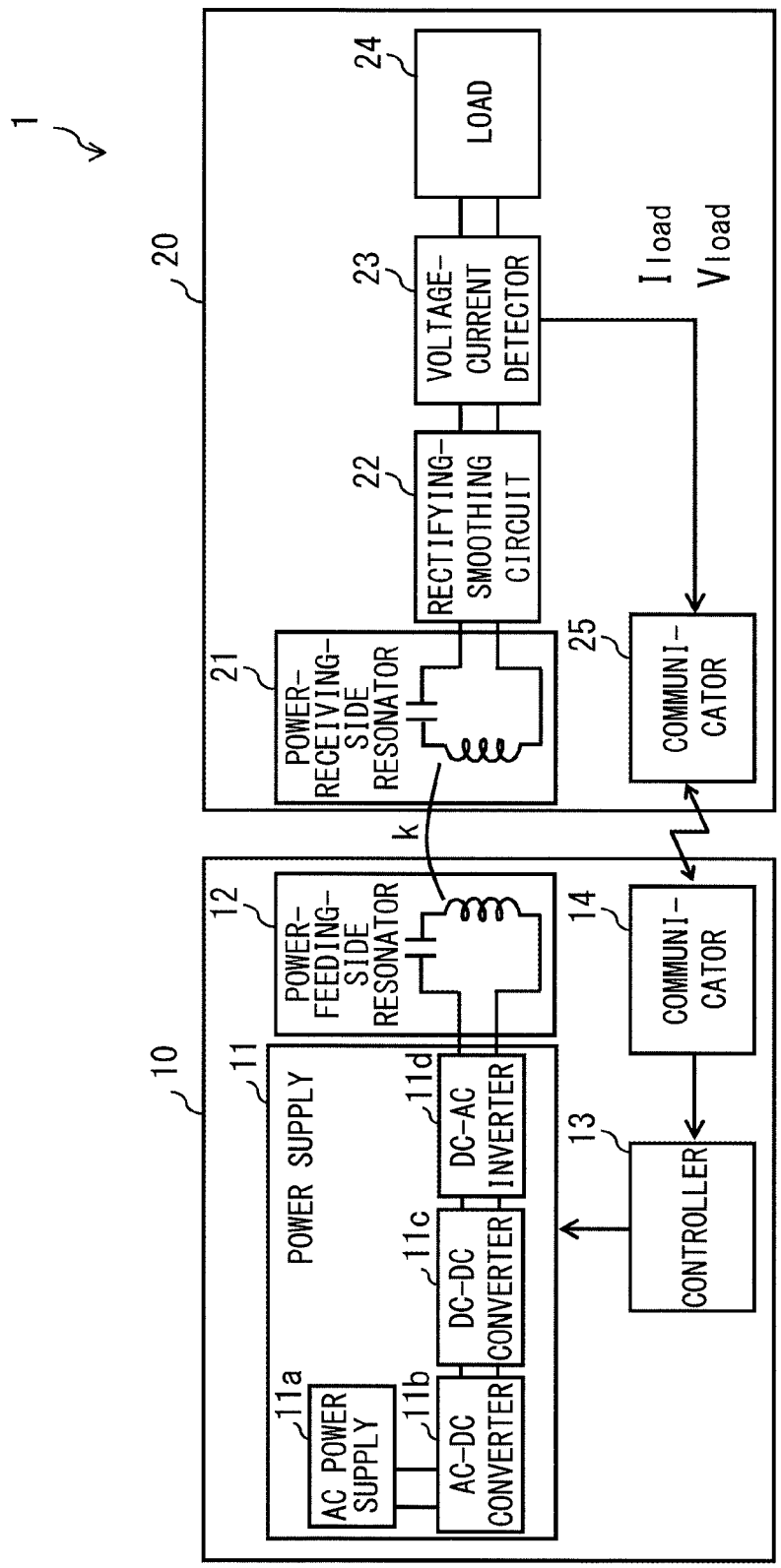
FIG. 1 illustrates an example of an outline configuration of a power feeding system according to a first embodiment of the technology.

Some example embodiments of the technology are described in detail below with reference to the drawings.

Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail.

1. First Embodiment

[Configuration]

FIG. 1 illustrates an example of an outline configuration of a power feeding system 1 according to a first embodiment of the technology. The power feeding system 1 transmits, in a contactless fashion, electric power from a power feeding apparatus 10 to a power receiving apparatus 20 by means of magnetic coupling. Non-limiting examples of the magnetic coupling may include a magnetic resonance. In one embodiment, the power feeding system 1 may transmit the electric power in a contactless fashion by means of a scheme based on the magnetic resonance. The magnetic resonance scheme refers to a technique in which a power feeding resonator 12 and a power receiving resonator 21 are each caused to have a high quality factor (i.e., a high "Q" factor) to allow both the power feeding resonator 12 and the power receiving resonator 21 to perform LC resonances at their respective frequencies that are electromagnetically the same as each other and thereby to transmit the electric power through spatially-accumulated magnetic energy. The magnetic resonance refers to a phenomenon in which oscillation of a magnetic field, generated as a result of flowing of a current in the power feeding resonator 12, is transferred to a resonance circuit, i.e., the power receiving resonator 21, of the power receiving apparatus 20 which resonates at the frequency same as that of a resonance circuit, i.e., the power feeding resonator 12, of the power feeding apparatus 10. The magnetic resonance involves transferring of the oscillation of the magnetic field from the power feeding resonator 12 to the power receiving resonator 21 and flowing of the current in the power receiving resonator 21, when the power receiving resonator 21 is located at a distance that is sufficiently shorter than a wavelength of the frequency to be used.

The power feeding system 1 includes the power feeding apparatus 10 and the power receiving apparatus 20. A load 24 may be coupled to the power receiving apparatus 20. FIG. 1 illustrates an example in which the load 24 is coupled to the power receiving apparatus 20. Non-limiting examples of the load 24 may include a battery and a motor.

[Power Feeding Apparatus 10]

The power feeding apparatus 10 includes a power supply 11, the power feeding resonator 12, a controller 13, and a communicator 14, for example. The power supply 11 may generate high-frequency electric power at a predetermined frequency and output the high-frequency electric power to the power feeding resonator 12. The predetermined frequency may be a frequency in a range from multiple MHz to hundreds of MHz. The power supply 11 may include an AC power supply 11a, an AC-DC converter 11b, a DC-DC converter 11c, and a DC-AC inverter 11d, for example. The term "AC" refers to alternating current, and the term "DC" refers to direct current. The AC power supply 11a may generate a high-frequency signal, i.e., a voltage signal. The AC-DC converter 11b may convert the high-frequency signal generated by the AC power supply 11a into a direct-current signal. The DC-DC converter 11c may change a voltage value of the direct-current signal generated by the AC-DC converter 11b to a predetermined voltage value. The DC-AC inverter 11d may convert a direct-current signal thus generated by the DC-DC converter 11c into a high-frequency signal, i.e., a voltage signal. The DC-AC inverter 11d may be coupled to an output of the DC-DC converter 11c. The DC-AC inverter 11d may be a pulse-width modulation (PWM) controlled inverter, and may include a bridge circuit and a drive circuit. The bridge circuit may include a plurality of switching devices. The drive circuit may supply a control signal to the bridge circuit.

The power feeding resonator 12 may transmit, to the power receiving resonator 21 of the power receiving apparatus 20 wirelessly, the high-frequency signal (i.e., the voltage signal) outputted from the power supply 11. The power feeding resonator 12 may include a series resonance circuit having an inductor and a capacitor, for example. The inductor may be configured by a solenoid coil having a plurality of turns. The capacitor may be coupled in series to the inductor. The power feeding resonator 12 may be so configured that a series resonance frequency fo of the series resonance circuit is adjusted to a frequency fg in MHz of the high-frequency electric power outputted from the power supply 11, for example. The frequency fg of the high-frequency electric power is referred to as a "power supply frequency fg" hereinafter. The series resonance frequency fo may be defined by the following expression:

$$fo = 1/[2\pi \cdot \sqrt{(L \cdot C)}]$$

where L denotes self inductance of the inductor, and C denotes capacitance of the capacitor.

The controller 13 may include a microcomputer that includes devices such as a read-only memory (ROM), a random-access memory (RAM), and a central processing unit (CPU). The controller 13 may alternatively include a field-programmable gate array (FPGA) or any other suitable control device. The controller 13 may output an output control signal to the power supply 11 and thereby control the high-frequency signal, i.e., the high-frequency electric power, to be outputted from the power supply 11. The output control signal may control an output voltage of the DC-AC inverter 11d.

FIG. 2 illustrates an example of functional blocks of the controller 13. The controller 13 may include a subtractor 13a and a PWM signal generator 13b, for example. The subtractor 13a may output deviation ΔI to the PWM signal generator 13b. The deviation ΔI may be defined by the following expression:

$$\Delta I = I\text{load}^* - I\text{load}$$

where Iload* denotes a target current value, and Iload is a current value detected by the power receiving apparatus 20. The PWM signal generator 13b may generate a PWM signal and output the generated PWM signal to the DC-AC inverter 11d. The PWM signal may be directed to controlling of the DC-AC inverter 11d.

The PWM signal generator 13b may control the high-frequency signal to be outputted from the power supply 11 to the power feeding resonator 12, on the basis of load information. In one embodiment, the load information may relate to a voltage value Vload and the current value Iload of the load 24, for example. The PWM signal generator 13b may generate the PWM signal on the basis of the voltage value Vload of the load 24 and the deviation ΔI, and output the generated PWM signal to the DC-AC inverter 11d. The deviation ΔI may be, in other words, deviation between the target current value Iload* and the current value Iload of the load 24. By outputting the PWM signal, the PWM signal generator 13b may control the DC-AC inverter 11d, i.e., the high-frequency signal to be generated by the DC-AC inverter 11d.

The PWM signal generator 13b may derive a gain K that corresponds to the voltage value Vload of the load 24, and generate the PWM signal on the basis of the derived gain K and the deviation ΔI. In one embodiment where the PWM signal generator 13b generates the PWM signal by means of a proportional-integral (PI) control, the gain K may be configured by a feedback gain Kp that serves as a proportional element and a feedback gain Ki that serves as an integrator element.

In one embodiment where the PWM signal generator 11b generates the PWM signal by means of a proportional-integral-derivative (PID) control, the gain K may be configured by the feedback gain Kp that serves as the proportional element, the feedback gain Ki that serves as the integrator element, and a feedback gain Kd that serves as a derivative element. In one embodiment where the PWM signal generator 13b generates the PWM signal by means of an integral (I) control, the gain K may be configured by the feedback gain Ki that serves as the integrator element. In one embodiment where the PWM signal generator 13b generates the PWM signal by means of a proportional (P) control, the gain K may be configured by the feedback gain Kp that serves as the proportional element.

The PWM signal generator 13b may include a gain table or a gain function in which the voltage value Vload of the load 24 and any gain are associated with each other, and derive any gain on the basis of the gain table or the gain function, for example. In one embodiment where the PWM signal generator 13b generates the PWM signal by means of the PI control, the PWM signal generator 13b may have a gain table 13A illustrated by way of example in FIG. 3 or a gain function in which the voltage value Vload of the load 24 and the gains (Kp and Ki) are associated with each other, for example. In such an embodiment, the PWM signal generator 13b may use the gain table 13A or the gain function to derive the gains (Kp and Ki).

FIG. 3 illustrates an example of the gain table 13A. The gain table 13A illustrated in FIG. 3 may include six sections as ranges of the voltage value Vload of the load 24. The gains (Kp and Ki) may be defined for each of the sections. In an example case where the voltage value Vload of the load 24 falls in a range between V3 and V4, the PWM signal generator 13b may extract gains Kp(3) and Ki(3) from the gain table 13A as the gains (Kp and Ki). It is to be noted that the number of sections provided in the gain table 13A is not limited to six.

The communicator 14 may perform communication with a later-described communicator 25 of the power receiving apparatus 20 wirelessly, for example. The communicator 14 and the communicator 25 may communicate with each other by means of close-proximity wireless communication such as, but not limited to, Bluetooth (Registered Trademark) and any other suitable short-range wireless communication. In one embodiment, the communicator 14 and the communicator 25 may perform wired communication. The communicator 14 may wirelessly receive, from the power receiving apparatus 20, a result of detection performed by a detector, for example. The result of the detection may include detection results of the voltage value Vload and the current value Iload, for example.

[Power Receiving Apparatus 20]

A description is given next of the power receiving apparatus 20. The power receiving apparatus 20 may include the power receiving resonator 21, a rectifying-smoothing circuit 22, a voltage-current detector 23, and the communicator 25, for example. The load 24 may be coupled to the power receiving apparatus 20.

The power receiving resonator 21 may be coupled to the power feeding resonator 12 of the power feeding apparatus 10 through the magnetic coupling and thereby receive the high-frequency electric power from the power feeding resonator 12. The power receiving resonator 21 may have a configuration the same as or similar to the configuration of the power feeding resonator 12. In one embodiment, the power receiving resonator 21 may include a series resonance circuit having an inductor and a capacitor, for example. The inductor may be configured by a solenoid coil having a plurality of turns. The capacitor may be coupled in series to the inductor. The power receiving resonator 21 may also be so configured that the series resonance frequency fo of the series resonance circuit, defined by the expression: fo=1/[2π·√(L·C)] where L denotes self inductance of the inductor and C denotes capacitance of the capacitor, is adjusted to the power supply frequency fg in MHz, for example.

FIG. 4 illustrates an example of a circuit configuration of the rectifying-smoothing circuit 22. The rectifying-smoothing circuit 22 may include a rectifying circuit 22a and a smoothing circuit 22b. The rectifying circuit 22a may rectify the high-frequency signal outputted from the power receiving resonator 21. The smoothing circuit 22b may perform smoothing of a signal having been rectified by the rectifying circuit 22a. The rectifying circuit 22a may be configured by a bridge circuit in which four rectifying devices are bridge connected, for example. The four rectifying devices each may be, for example but not limited to, a Schottky barrier diode. Note that the rectifying device may possibly be formed with a capacitor that is formed parallel inside the device, causing a high-frequency current with an advanced phase to flow via the capacitor at a high frequency (HF) band. In one embodiment, to cancel the phase-advanced high-frequency current, an inductor may be coupled in parallel to an input end of the rectifying circuit 22a.

The voltage-current detector 23 may include a DC voltmeter and a DC ammeter. The DC voltmeter may measure a DC voltage, i.e., the voltage value Vload, to be applied from the rectifying-smoothing circuit 22 to the load 24. The DC ammeter may measure a DC current, i.e., the current value Iload, to be supplied from the rectifying-smoothing circuit 22 to the load 24. The voltage-current detector 23 may output, through the communicators 25 and 14, the detected voltage value Vload and the detected current value Iload to the controller 13 provided in the power feeding apparatus 10. The communicator 25 may wirelessly transmit, to the power feeding apparatus 10, the result of detection performed by the detector, i.e., detection results of the voltage value Vload and the current value Iload, for example.

A description is given next of a feedback control performed in the power feeding system 1. As one embodiment, the description is given with reference to a non-limiting example in which the load 24 is a battery and a control scheme is based on the PI control. A standard configuration may be as illustrated in FIG. 4 when the load 24 coupled to the power receiving apparatus 20 is regarded as a capacitor, where R in FIG. 4 is a virtual resistor as aggregation of resistance components in the power receiving apparatus 20.

In an example case where the voltage value of the load 24 is defined as Vload, a resistance value of the virtual resistor is defined as R, and the current value of current that flows in the virtual resistor and the load 24 is defined as the Iload, the Vload in this case is expressed by the following expression (1):

$$Vload(t) = Vo \times [1 - \exp(-t/\tau)] \qquad (1)$$

where Vo denotes an output voltage of the rectifying-smoothing circuit 22, and τ is expressed by RC (resistance and capacitance). It can be appreciated from the expression (1) that a voltage of the load 24, e.g., the battery, increases with an elapse of time.

Further, the following expression (2) is derived from a relational expression between the voltage and electric charges of the load 24, e.g., the battery.

$$Q = C \times Vload(t) \qquad (2)$$

Therefore, this leads to the following expression (3).

$$\begin{aligned} i(t) &= dQ/dt = CdVload(t)/dt \\ &= CVo/(RC) \times \exp(-t/\tau) \\ &= Vo/R \times \exp(-t/\tau) \end{aligned} \qquad (3)$$

Accordingly, the following expression (4) is satisfied when impedance of the load 24, e.g., the battery, in direct current is defined as Z(t).

$$\begin{aligned} Z(t) &= Vload(t)/i(t) \\ &= R \times [\exp(t/\tau) - 1] \end{aligned} \qquad (4)$$

According to the expression (4), Z(0) equals zero (Z(0)=0) when t equals zero (t=0), and Z(0) becomes infinite (Z(0)=∞) when t becomes infinite (t→∞). The expression (4) therefore corresponds to a qualitative analysis result.

It can be appreciated from the foregoing that a battery voltage (Vload(t)) rises with an elapse of time and impedance (Z(t)) increases together. This means that it is possible to obtain information on impedance by referring to the voltage (Vload(t)) of the load 24 (e.g., the battery) as a reference value.

In addition, a typical PI controlling expression is expressed as the following expressions (5) and (6) when the typical PI controlling expression is defined in a discrete form. A typical PID controlling expression is expressed as the following expressions (5) and (7) when the typical PID controlling expression is defined in a discrete form.

$$u(k) = u(k-1) + \Delta u(k) \qquad (5)$$

$$\Delta u(k) = Kp \times e(k) + Ki \times e(k) \qquad (6)$$

$$\Delta u(k) = Kp \times e(k) + Ki \times e(k) + Kd \times (e(k) - e(k-1)) \qquad (7)$$

In the expressions (5) to (7), u(k) and u(k−1) are each a control signal, e(k) is deviation relative to a target value, Kp is a gain value in the P control, Ki is a gain value in the I control, and Kd is a gain value in a derivative (D) control.

On the basis of the foregoing example method, it is possible to estimate, in a wireless power feeding scheme, the impedance by monitoring the battery voltage (Vload(t)) and to set such a gain value that allows for appropriate formation of a current waveform that is based on a result of the estimation. This holds true for both a current feedback and a voltage feedback as well and thus the same effects are obtainable by any of the current feedback and the voltage feedback.

[Power Feeding Procedure]

Figure 5:
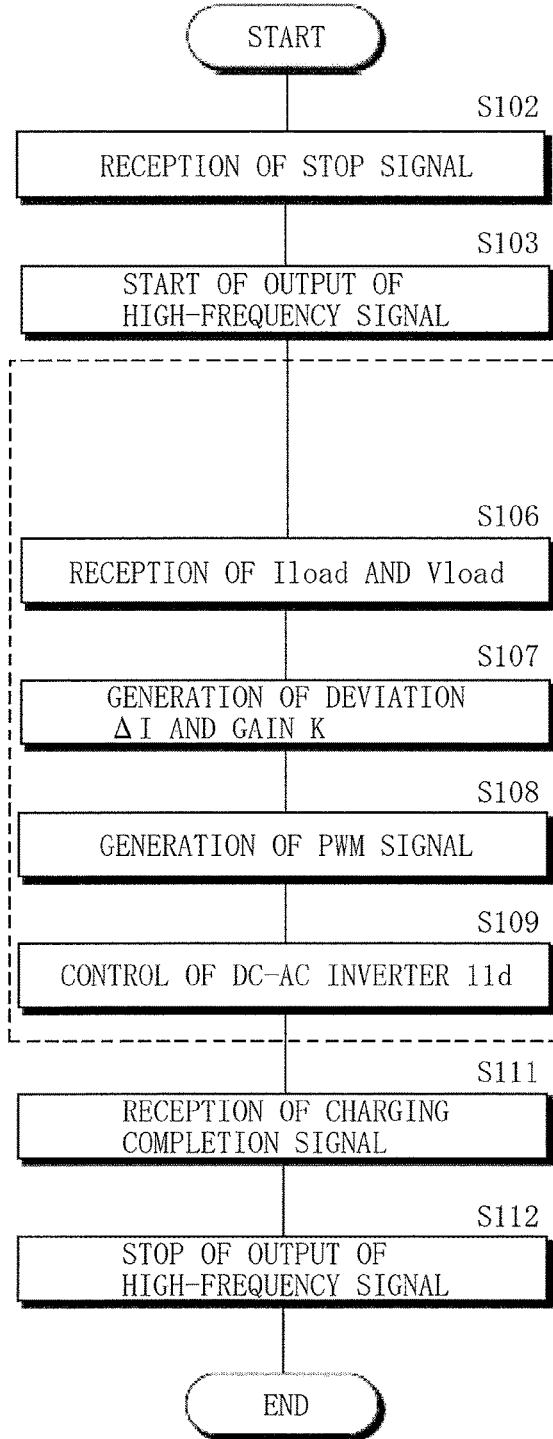
FIG. 5 illustrates an example of a procedure for power feeding performed in the power feeding system illustrated in FIG. 1.
Figure 5:
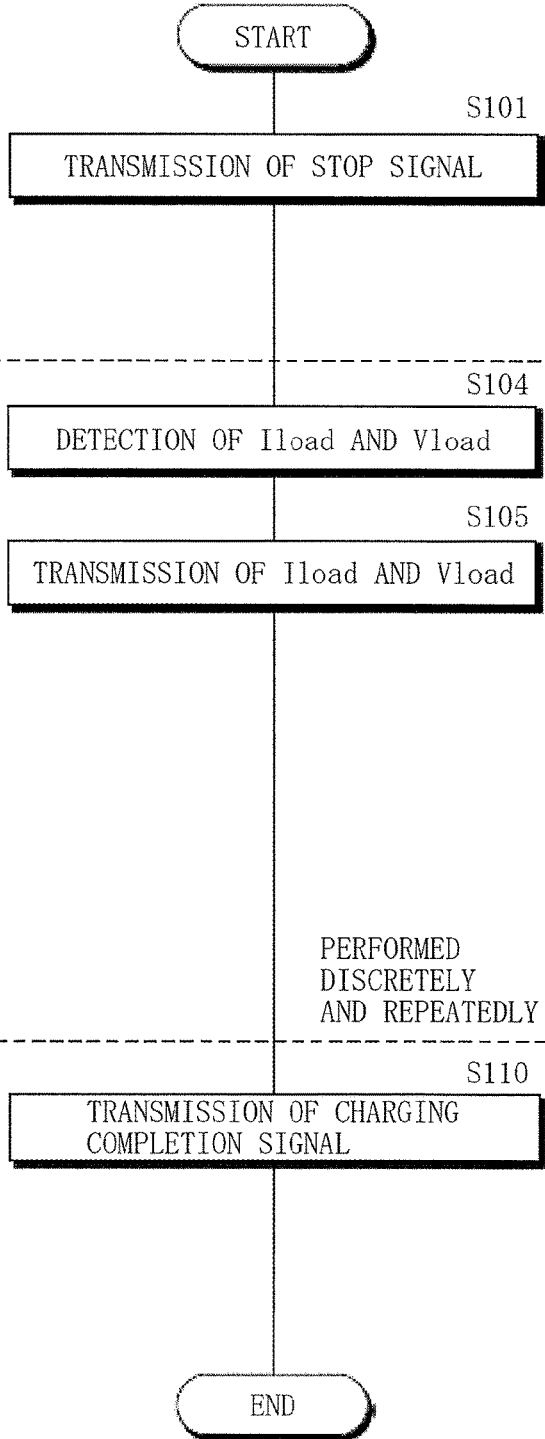

A description is given next of a procedure for power feeding performed in the power feeding system 1. FIG. 5 illustrates an example of the procedure for power feeding performed in the power feeding system 1. As one embodiment, the description is given with reference to a non-limiting example in which the power receiving apparatus 20 is mounted on a mobile body and moves together with the mobile body, and in which the power feeding apparatus 10 is disposed adjacent to a path along which the mobile body mounted with the power receiving apparatus 20 travels. Non-limiting examples of the mobile body may include a wheeled platform and a vehicle including an automobile.

First, when the mobile body mounted with the power receiving apparatus 20 stops, a stop signal is supplied from the mobile body to the power receiving apparatus 20. When the input of the stop signal is received, the power receiving apparatus 20 may transmit the received stop signal to the power feeding apparatus 10 (step S101). When the stop signal is received from the power receiving apparatus 20 (step S102), the controller 13 of the power feeding apparatus 10 may instruct the power supply 11 to start the output of the high-frequency signal. This may start the output of the high-frequency signal from the power supply 11 to the power feeding resonator 12 (step S103). The magnetic field is generated from the power feeding resonator 12 when the high-frequency signal flows in the power feeding resonator 12, thereby causing the oscillation of the thus-generated magnetic field to be transferred to the resonance circuit i.e., the power receiving resonator 21, of the power receiving apparatus 20 which resonates at the frequency same as that of the resonance circuit, i.e., the power feeding resonator 12, of the power feeding apparatus 10. As a result, the high-frequency signal is generated in the power receiving resonator 21. The high-frequency signal thus generated in the power receiving resonator 21 may be rectified and subjected to the smoothing by the rectifying-smoothing circuit 22. As a result, the DC voltage is applied to the load 24 and the DC current flows to the load 24.

Upon the application of the DC voltage and the flowing of the DC current to the load 24, the voltage-current detector 23 may detect the voltage value Vload and the current value Iload of the load 24 (step S104), and may thereafter transmit the detected voltage value Vload and the detected current value Iload to the power feeding apparatus 10 (step S105). When the voltage value Vload and the current value Iload of the load 24 are received (step S106), the power feeding apparatus 10, or the controller 13 more specifically, may determine the deviation ΔI on the basis of the received current value Iload of the load 24, and determine the gain K (for example, the gains Kp and Ki) on the basis of the received voltage value Vload of the load 24 (step S107). Thereafter, the power feeding apparatus 10, or the controller 13 more specifically, may generate the PWM signal on the basis of the determined deviation ΔI and the determined gain K (for example, the gains Kp and Ki) (step S108). Thereafter, the power feeding apparatus 10, or the controller 13 more specifically, may output the thus-generated PWM signal to the DC-AC inverter 11d and thereby control the DC-AC inverter 11d (step S109). In other words, the power feeding apparatus 10, or the controller 13 more specifically, may thereby control the high-frequency signal to be outputted to the power feeding resonator 12. This means that, in one embodiment, the power feeding apparatus 10, or the controller 13 more specifically, controls the high-frequency signal on the basis of the voltage value Vload and the current value Iload of the load 24 both received from the power receiving apparatus 20, after instructing the power supply 11 to start the output of the high-frequency signal. In other words, in one embodiment, the power feeding apparatus 10, or the controller 13 more specifically, performs, on the power supply 11, the control of the high-frequency signal that is based on the voltage value Vload and the current value Iload of the load 24 both received through the communicator 14, immediately after the starting of the output of the high-frequency signal.

The power feeding system 1 may repeatedly perform the processes from step S104 to step S109 until the power receiving apparatus 20 detects a signal indicating the completion of charging. When the charging completion signal is detected, the power receiving apparatus 20 may transmit the charging completion signal to the power feeding apparatus 10 (step S110). When the charging completion signal is received from the power receiving apparatus 20 (step S111), the power feeding apparatus 10, or the controller 13 more specifically, may instruct the power supply 11 to stop the output of the high-frequency signal. This may stop the output of the high-frequency signal from the power supply 11 to the power feeding resonator 12 (step S112).

[Effects]

A description is given next of some effects of the power feeding system 1.

Figure 6:
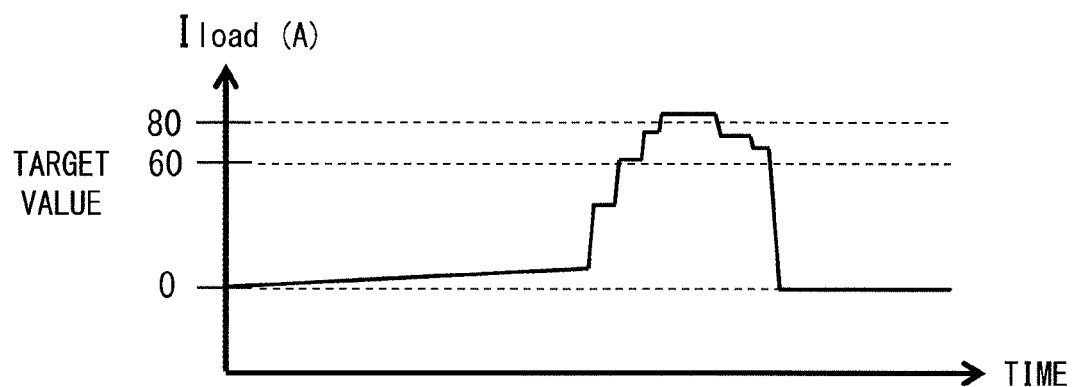
FIG. 6 illustrates an example of an output waveform when no feedback is provided to a DC-AC inverter illustrated in FIG. 1.

Referring to FIG. 6, a rush current flows into a device such as a motor and a battery when, for example, a large current is fed to the motor upon its starting or charging of the battery is started. The occurrence of the rush current may heat the device such as the motor and the battery, and may possibly reduce the device life accordingly. The occurrence of the rush current may also cause a large current to be fed instantaneously to a circuit provided at the periphery of the device such as the motor and the battery, which may necessitate excessive designing for device protection accordingly.

To address those concerns, measures have been proposed that reduce the rush current. For example, a technique disclosed in JP-A No. H07-336609 causes a resistor to be connected with a circuit only upon the occurrence of the rush current, and otherwise causes the resistor to be disconnected from the circuit. For example, a technique disclosed in JP-A No. 2011-199949 is provided with an inductor that evades the rush current. The inductor is high in resistance to a high-frequency component but is ideally non-resistance to a direct-current component. Use of the inductor is thus advantageous in that a loss is extremely small when the rush current is not generated. The techniques disclosed in JP-A No. H07-336609 and No. 2011-199949, however, both involve an insertion of an electrical circuit component, incurring an increase in size of an apparatus and a rise in cost.

Figure 7:
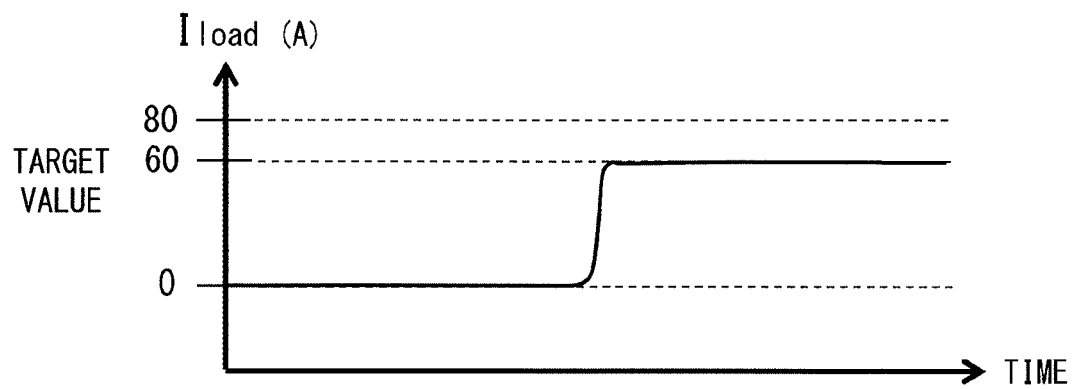
FIG. 7 illustrates an example of an output waveform when the feedback is provided to the DC-AC inverter illustrated in FIG. 1.
Figure 8:
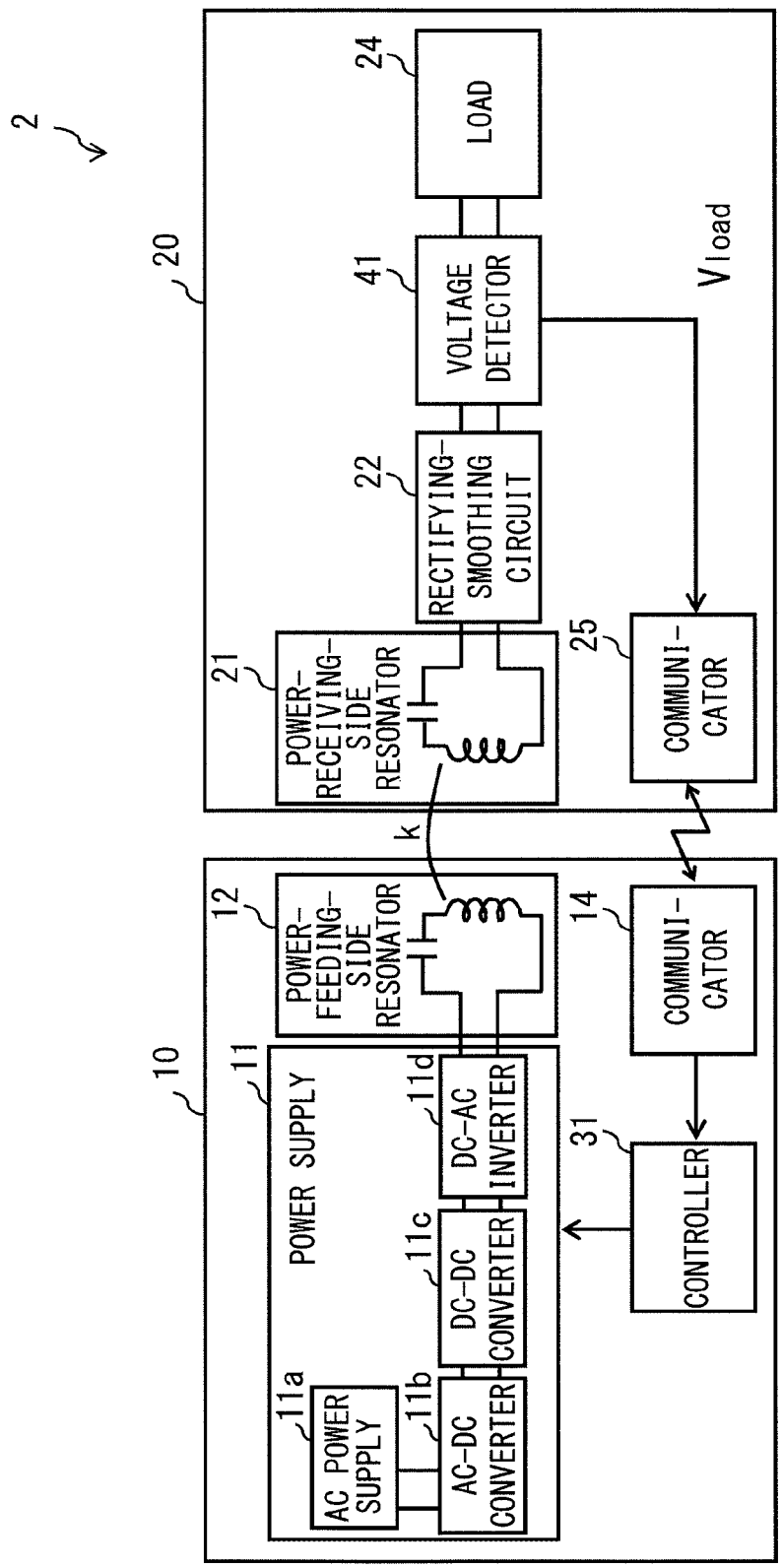
FIG. 8 illustrates an example of an outline configuration of a power feeding system according to a second embodiment of the technology.

In contrast, according to one embodiment, the high-frequency signal to be outputted from the power supply 11 to the power feeding resonator 12 is controlled on the basis of the load information. The load information relates at least to the voltage value Vload between the voltage value Vload and the current value Iload of the load 24. Thus, it is possible to obtain the appropriate voltage Vo that is based on a magnitude of the impedance. This means that it is possible to decrease the voltage Vo appropriately under a low impedance condition where the rush current may possibly occur. Hence, it is possible to reduce the rush current as illustrated by way of example in FIG. 7. It is also possible to allow the current value Iload to reach the target value promptly. It is to be further noted that, in one embodiment where the voltage-current detector 23 is provided in the power receiving apparatus 20 for any other purpose, it is not necessary to newly add an electrical circuit component in order to control the high-frequency signal to be outputted to the power feeding resonator 12. In such an embodiment, it is possible to reduce the rush current while suppressing the increase in size of an apparatus and the rise in cost.

In addition, according to one embodiment, the PWM signal may be generated on the basis of the voltage value Vload of the load 24 and the deviation ΔI. The deviation ΔI may be the deviation between the target current value and the current value Iload. The thus-generated PWM signal may be outputted to the DC-AC inverter 11d to thereby control the high-frequency signal. Thus, it is possible to obtain the appropriate voltage Vo that is based on the magnitude of the impedance. This means that it is possible to decrease the voltage Vo appropriately under a low impedance condition where the rush current may possibly occur. Hence, it is possible to reduce the rush current.

Further, according to one embodiment, the gain K corresponding to the voltage value Vload of the load 24 may be derived, and the PWM signal may be generated on the basis of the derived gain K and the deviation ΔI. Thus, it is possible to obtain the appropriate voltage Vo that is based on the magnitude of the impedance. This means that it is possible to decrease the voltage Vo appropriately under a low impedance condition where the rush current may possibly occur. Hence, it is possible to reduce the rush current.

Moreover, according to one embodiment, the gain table or the gain function may be included in which the voltage value Vload of the load 24 and the gain K are associated with each other, and the gain K may be derived on the basis of the gain table or the gain function. Thus, it is possible to obtain, in a short calculation time, the appropriate voltage Vo that is based on the magnitude of the impedance. This means that it is possible to decrease the voltage Vo appropriately under a low impedance condition where the rush current may possibly occur. Hence, it is possible to reduce the rush current.

In addition, according to one embodiment, the high-frequency signal may be controlled on the basis of the load information received from the power receiving apparatus 20, after the instructions on the start of the output of the high-frequency signal is given to the power supply 11. In other words, the high-frequency signal may be controlled on the basis of the voltage value Vload and the current value Iload of the load 24 both received from the power receiving apparatus 20, after the instructions on the start of the output of the high-frequency signal is given to the power supply 11. Thus, it is possible to obtain, at timing at which the rush current may possibly occur, the appropriate voltage Vo that is based on the magnitude of the impedance. This means that it is possible to decrease the voltage Vo appropriately under a low impedance condition where the rush current may possibly occur. Hence, it is possible to reduce the rush current.

2. Second Embodiment

[Configuration]

A description is given next of a power feeding system 2 according to a second embodiment of the technology. The power feeding system 2 may be similar to the power feeding system 1 with exception that a voltage detector 41 is provided instead of the voltage-current detector 23 and that a controller 31 is further provided instead of the controller 13.

The voltage detector 41 may include the DC voltmeter that measures the DC voltage, i.e., the voltage value Vload, to be applied from the rectifying-smoothing circuit 22 to the load 24. The voltage detector 41 may output, through the communicators 25 and 14, the detected voltage value Vload to the controller 31 provided in the power feeding apparatus 10.

The controller 31 may include the microcomputer that includes devices such as the ROM, the RAM, and the CPU, the FPGA, or any other suitable control device. The controller 31 may output an output control signal to the power supply 11 and thereby control the high-frequency signal, i.e., the high-frequency electric power, to be outputted from the power supply 11. The output control signal may control the output voltage of the DC-DC converter 11c. The DC-DC converter 11c may be a PWM controlled converter, and may include a bridge circuit and a drive circuit, for example. The bridge circuit may include a plurality of switching devices. The drive circuit may supply a control signal to the bridge circuit.

Figure 9:
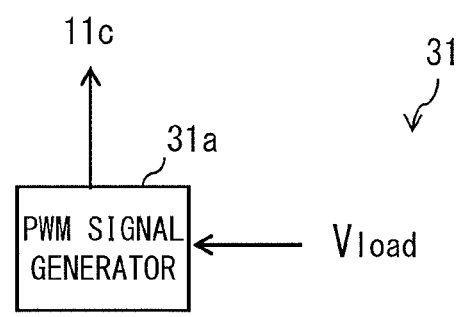
FIG. 9 illustrates an example of functional blocks of a controller provided in a power feeding apparatus illustrated in FIG. 8.

FIG. 9 illustrates an example of functional blocks of the controller 31. The controller 31 may include a PWM signal generator 31a, for example. The PWM signal generator 31a may generate a PWM signal directed to controlling of the DC-DC converter 11c, and output the generated PWM signal to the DC-DC converter 11c.

The controller 31 may generate the PWM signal on the basis of the voltage value Vload of the load 24, and output the thus-generated PWM signal to the DC-DC converter 11c to thereby control the high-frequency signal, for example. The controller 31 may so generate the PWM signal that the output voltage of the DC-DC converter 11c follows a variation in the voltage value Vload of the load 24.

A description is given next of a feedback control performed in the power feeding system 2. As one embodiment, the description is given with reference to a non-limiting example in which the load 24 is a battery and a control scheme is based on the PI control. A standard configuration may be as illustrated in FIG. 4 when the load 24 coupled to the power receiving apparatus 20 is regarded as a capacitor.

In an example case where the voltage value of the load 24 is defined as Vload, a resistance value of the virtual resistor is defined as R, and the current value of current that flows in the virtual resistor and the load 24 is defined as the Iload, the Vload in this case is expressed by the following expression (1):

$$V\text{load}(t) = Vo \times [1 - \exp(-t/\tau)] \quad (1)$$

It can be appreciated from the expression (1) that the voltage of the load 24, e.g., the battery, increases with an elapse of time.

Further, the following expression (2) is derived from a relational expression between the voltage and the electric charges of the load 24, e.g., the battery.

$$Q = C \times V\text{load}(t) \quad (2)$$

Therefore, this leads to the following expression (3).

$$\begin{aligned} i(t) &= dQ/dt = CdV\text{load}(t)/dt \\ &= CVo/(RC) \times \exp(-t/\tau) \\ &= Vo/R \times \exp(-t/\tau) \end{aligned} \quad (3)$$

Accordingly, the following expression (4) is satisfied when impedance of the load 24, e.g., the battery, in direct current is defined as Z(t).

$$Z(t) = Vload(t)/i(t) \quad (4)$$
$$= R \times [\exp(t/\tau) - 1]$$

According to the expression (4), Z(0) equals zero (Z(0)=0) when t equals zero (t=0), and Z(0) becomes infinite (Z(0)→∞) when t becomes infinite (t→∞). The expression (4) therefore corresponds to a qualitative analysis result.

It can be appreciated from the foregoing that the battery voltage (Vload(t)) rises with an elapse of time and the impedance (Z(t)) increases together. This means that it is possible to obtain the information on impedance by referring to the voltage (Vload(t)) of the load 24 (e.g., the battery) as a reference value.

In addition, the following expression (8) is derived by modifying the expression (3).

$$Vo(t) = R \times \exp(-t/\tau) = Vload(t)/Z(t) \quad (8)$$

The following expression (9) is also derived by modifying the expression (3) with the inclusion of the expression (4).

$$i(t) = Vo(t)/R \times \exp(-t/\tau) \quad (9)$$
$$= Vload(t)/Z(t)$$

Accordingly, in accordance with the foregoing expressions, the current flows at a constant voltage to the load 24, e.g., the battery, when Vo(t) is made constant. Further, it is possible to cause the current to flow at a constant current to the load 24, e.g., the battery, when Vo(t) is varied such that "Vo(t)/R×exp(-t/τ)" becomes constant. In addition, the current is expressed by the ratio "Vload(t)/Z(t)", meaning that it is possible to perform a constant current control easily by simply so varying Vo(t) as to follow the variation in Vload(t). This example method makes it possible to vary Vo(t) in accordance with the variation in Vload(t) with use of the feedback control, even when R is unknown. This is advantageous in that, for example, it is possible to eliminate a current sensor.

On the basis of the foregoing example method, it is possible to estimate, in a wireless power feeding scheme, the impedance by monitoring the battery voltage (Vload(t)). Further, it is possible to perform a constant voltage control and a constant current control by controlling, in an appropriate fashion, the output voltage of the DC-DC converter 11c with use of a result of the estimation and on the basis of the foregoing expressions. In general, a control directed to the output voltage of the DC-DC converter 11c is fast, meaning that it is possible to achieve a detailed control, such as a control that suppresses the rush current.

[Power Feeding Procedure]

Figure 10:
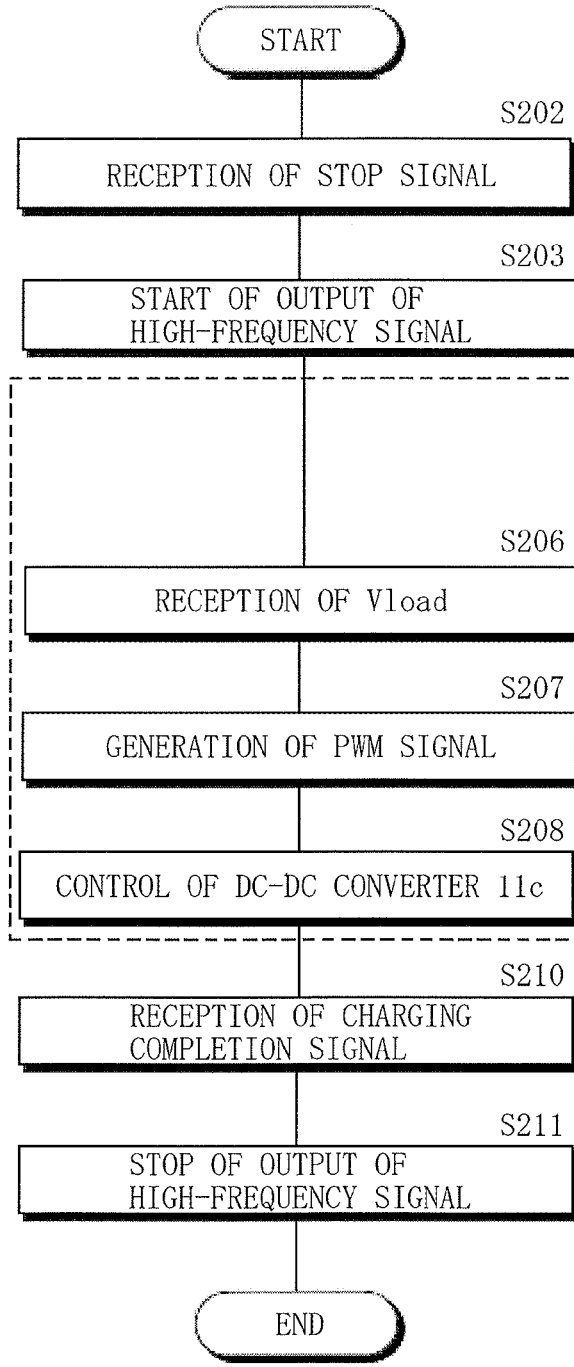
FIG. 10 illustrates an example of a procedure for power feeding performed in the power feeding system illustrated in FIG. 8.
Figure 10:
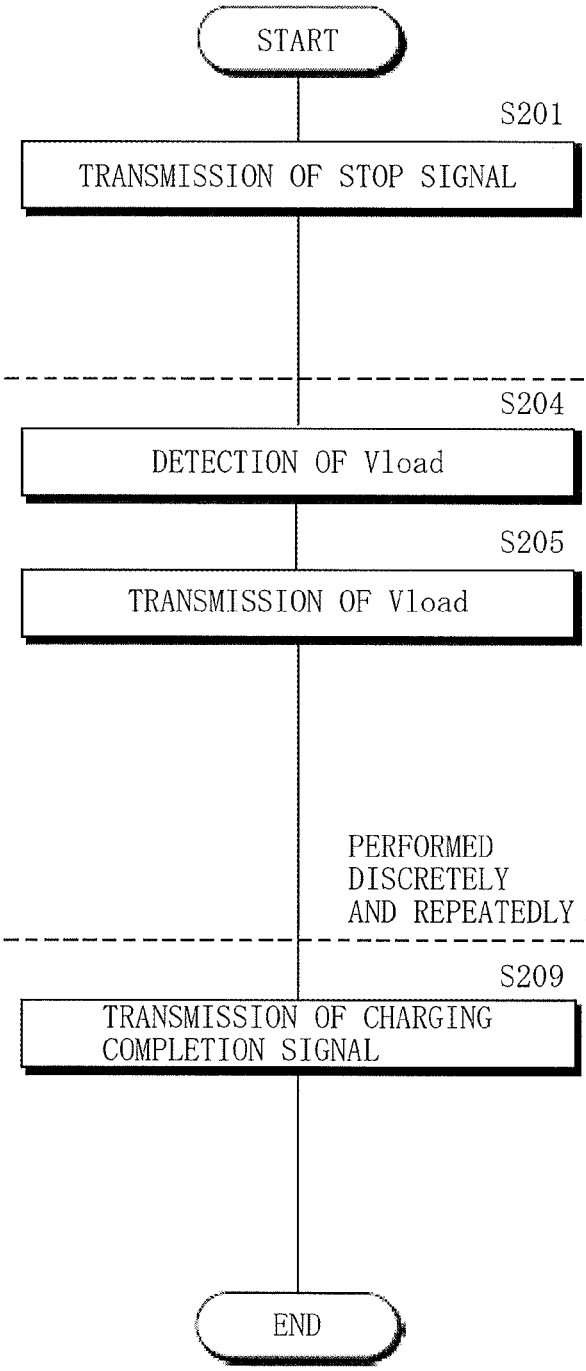

A description is given next of a procedure for power feeding performed in the power feeding system 2. FIG. 10 illustrates an example of the procedure for power feeding performed in the power feeding system 2. As one embodiment, the description is given with reference to a non-limiting example in which the power receiving apparatus 20 is mounted on a mobile body and moves together with the mobile body, and in which the power feeding apparatus 10 is disposed adjacent to a path along which the mobile body mounted with the power receiving apparatus 20 travels. Non-limiting examples of the mobile body may include a wheeled platform and a vehicle including an automobile.

First, when the mobile body mounted with the power receiving apparatus 20 stops, a stop signal is supplied from the mobile body to the power receiving apparatus 20. When the input of the stop signal is received, the power receiving apparatus 20 may transmit the received stop signal to the power feeding apparatus 10 (step S201). When the stop signal is received from the power receiving apparatus 20 (step S202), the controller 31 of the power feeding apparatus 10 may instruct the power supply 11 to start the output of the high-frequency signal. This may start the output of the high-frequency signal from the power supply 11 to the power feeding resonator 12 (step S203). The magnetic field is generated from the power feeding resonator 12 when the high-frequency signal flows in the power feeding resonator 12, thereby causing the oscillation of the thus-generated magnetic field to be transferred to the resonance circuit i.e., the power receiving resonator 21, of the power receiving apparatus 20 which resonates at the frequency same as that of the resonance circuit, i.e., the power feeding resonator 12, of the power feeding apparatus 10. As a result, the high-frequency signal is generated in the power receiving resonator 21. The high-frequency signal thus generated in the power receiving resonator 21 may be rectified and subjected to the smoothing by the rectifying-smoothing circuit 22. As a result, the DC voltage is applied to the load 24 and the DC current flows to the load 24.

Upon the application of the DC voltage and the flowing of the DC current to the load 24, the voltage-current detector 23 may detect the voltage value Vload of the load 24 (step S204), and may thereafter transmit the detected voltage value Vload to the power feeding apparatus 10 (step S205). When the voltage value Vload of the load 24 is received (step S206), the power feeding apparatus 10, or the controller 31 more specifically, may generate the PWM signal on the basis of the received voltage value Vload of the load 24 (step S207). The power feeding apparatus 10, or the controller 31 more specifically, may so generate the PWM signal that the output voltage of the DC-DC converter 11c follows the variation in the voltage value Vload of the load 24. Thereafter, the power feeding apparatus 10, or the controller 31 more specifically, may output the thus-generated PWM signal to the DC-DC converter 11c and thereby control the DC-DC converter 11c (step S208). In other words, the power feeding apparatus 10, or the controller 31 more specifically, may thereby control the high-frequency signal to be outputted to the power feeding resonator 12. This means that, in one embodiment, the power feeding apparatus 10, or the controller 31 more specifically, controls the high-frequency signal on the basis of the voltage value Vload of the load 24 received from the power receiving apparatus 20, after instructing the power supply 11 to start the output of the high-frequency signal. In other words, in one embodiment, the power feeding apparatus 10, or the controller 31 more specifically, performs, on the power supply 11, the control of the high-frequency signal that is based on the voltage value Vload of the load 24 received through the communicator 14, immediately after the starting of the output of the high-frequency signal.

The power feeding system 2 may repeatedly perform the processes from step S204 to step S208 until the power receiving apparatus 20 detects the charging completion signal. When the charging completion signal is detected, the power receiving apparatus 20 may transmit the charging completion signal to the power feeding apparatus 10 (step S209). When the charging completion signal is received from the power receiving apparatus 20 (step S210), the power feeding apparatus 10, or the controller 31 more specifically, may instruct the power supply 11 to stop the output of the high-frequency signal. This may stop the output of the high-frequency signal from the power supply 11 to the power feeding resonator 12 (step S211).

[Effects]

A description is given next of some effects of the power feeding system 2.

According to one embodiment, the high-frequency signal to be outputted from the power supply 11 to the power feeding resonator 12 may be controlled on the basis of the load information that relates to the voltage value Vload of the load 24. Thus, it is possible to obtain the appropriate voltage Vo that is based on a magnitude of the impedance. This means that it is possible to decrease the voltage Vo appropriately under a low impedance condition where the rush current may possibly occur. Hence, it is possible to reduce the rush current. In addition, this embodiment eliminates the necessity of providing a current detector in the power receiving apparatus 20. Hence, it is possible to reduce the rush current while suppressing the increase in size of an apparatus and the rise in cost.

In addition, according to one embodiment, the PWM signal may be generated on the basis of the voltage value Vload of the load 24, and the thus-generated PWM signal may be outputted to the DC-DC converter 11c to thereby control the high-frequency signal. Thus, it is possible to obtain the appropriate voltage Vo that is based on the magnitude of the impedance. This means that it is possible to decrease the voltage Vo appropriately under a low impedance condition where the rush current may possibly occur. Hence, it is possible to reduce the rush current.

Further, according to one embodiment, the PWM signal may be so generated that the output voltage of the DC-DC converter 11c follows the variation in the voltage value Vload of the load 24. Thus, it is possible to obtain the appropriate voltage Vo that is based on the magnitude of the impedance. This means that it is possible to decrease the voltage Vo appropriately under a low impedance condition where the rush current may possibly occur. Hence, it is possible to reduce the rush current.

In addition, according to one embodiment, the high-frequency signal may be controlled on the basis of the load information received from the power receiving apparatus 20, after the instructions on the start of the output of the high-frequency signal is given to the power supply 11. In other words, the high-frequency signal may be controlled on the basis of the voltage value Vload of the load 24 received from the power receiving apparatus 20, after the instructions on the start of the output of the high-frequency signal is given to the power supply 11. Thus, it is possible to obtain, at timing at which the rush current may possibly occur, the appropriate voltage Vo that is based on the magnitude of the impedance. This means that it is possible to decrease the voltage Vo appropriately under a low impedance condition where the rush current may possibly occur. Hence, it is possible to reduce the rush current.

3. Third Embodiment

Figure 11:
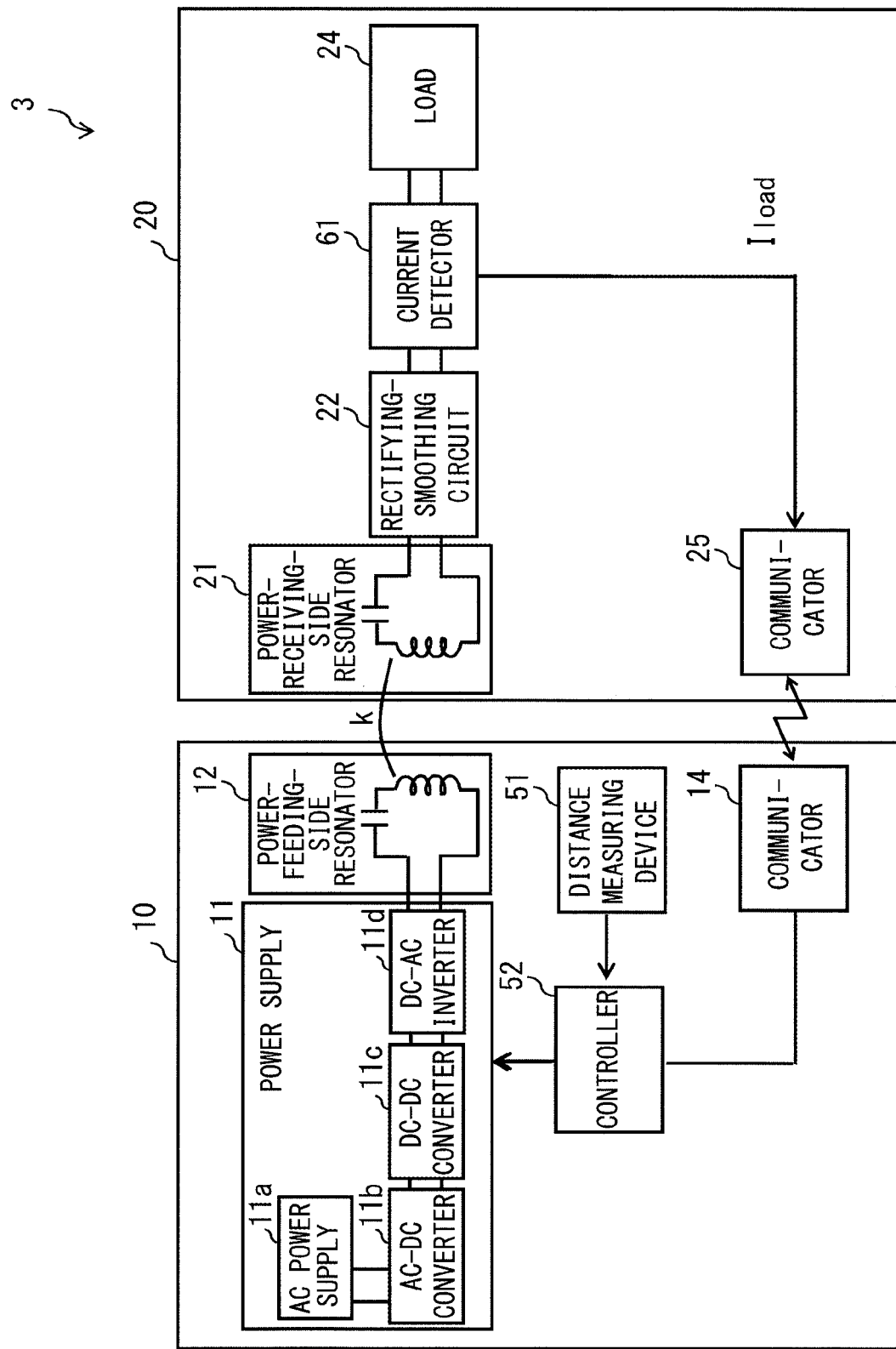
FIG. 11 illustrates an example of an outline configuration of a power feeding system according to a third embodiment of the technology.

A description is given next of a power feeding system 3 according to a third embodiment of the technology. FIG. 11 illustrates an example of an outline configuration of the power feeding system 3. The power feeding system 3 may be similar to the power feeding system 1 with exception that a current detector 61 is provided instead of the voltage-current detector 23, a controller 52 is further provided instead of the controller 13, and a distance measuring device 51 is further provided.

The current detector 61 may include the DC ammeter that measures the DC current, i.e., the current value Iload, to be supplied from the rectifying-smoothing circuit 22 to the load 24. The current detector 61 may output, through the communicators 25 and 14, the detected current value Iload to the controller 52 provided in the power feeding apparatus 10.

The distance measuring device 51 may measure a distance between the power feeding apparatus 10 and the power receiving apparatus 20. The distance may relate to the magnetic coupling. For example, the distance measuring device 51 may be a stereo camera, a ranging sensor of a time-of-flight (ToF) type, or any other suitable device that measures the distance. The distance measuring device 51 may output a distance D obtained by the measurement to the controller 52.

The controller 52 may include the microcomputer that includes devices such as the ROM, the RAM, and the CPU, the FPGA, or any other suitable control device. The controller 52 may output the output control signal to the power supply 11 and thereby control the high-frequency signal, i.e., the high-frequency electric power, to be outputted from the power supply 11. The output control signal may control the output voltage of the DC-DC converter 11c.

Figures 12, 13:
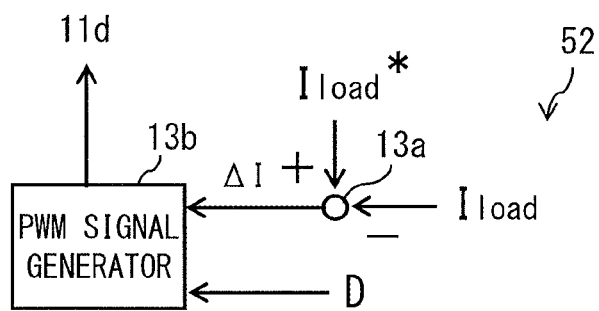
FIG. 12 illustrates an example of functional blocks of a controller provided in a power feeding apparatus illustrated in FIG. 11.
FIG. 13 illustrates an example of a gain table stored in the controller provided in the power feeding apparatus illustrated in FIG. 11.

FIG. 12 illustrates an example of functional blocks of the controller 52. The controller 52 may include the subtractor 13a and the PWM signal generator 13b, for example. The subtractor 13a may output the deviation $\Delta I$ to the PWM signal generator 13b. The deviation $\Delta I$ may be defined by the following expression:

$$\Delta I = I\text{load}^* - I\text{load}$$

where Iload* denotes the target current value, and Iload is the current value detected by the power receiving apparatus 20. The PWM signal generator 13b may generate the PWM signal and output the generated PWM signal to the DC-AC inverter 11d. The PWM signal may be directed to controlling of the DC-AC inverter 11d.

The PWM signal generator 13b may control the high-frequency signal to be outputted from the power supply 11 to the power feeding resonator 12, on the basis of information on the distance D and the current value Iload, for example. In one embodiment, the information may correspond to "power-receiving-side information". The PWM signal generator 13b may generate the PWM signal on the basis of the distance D and the deviation $\Delta I$, and output the generated PWM signal to the DC-AC inverter 11d. The deviation $\Delta I$ may be, in other words, the deviation between the target current value Iload* and the current value Iload of the load 24. By outputting the PWM signal, the PWM signal generator 13b may control the DC-AC inverter 11d, i.e., the high-frequency signal to be generated by the DC-AC inverter 11d.

The PWM signal generator 13b may derive the gain K that corresponds to the distance D, and generate the PWM signal on the basis of the derived gain K and the deviation $\Delta I$. In one embodiment where the PWM signal generator 13b generates the PWM signal by means of the proportional-integral (PI) control, the gain K may be configured by the feedback gain Kp that serves as the proportional element and the feedback gain Ki that serves as the integrator element.

In one embodiment where the PWM signal generator 13b generates the PWM signal by means of the proportional-integral-derivative (PID) control, the gain K may be configured by the feedback gain Kp that serves as the proportional element, the feedback gain Ki that serves as the integrator element, and the feedback gain Kd that serves as the derivative element. In one embodiment where the PWM signal generator 13b generates the PWM signal by means of the integral (I) control, the gain K may be configured by the feedback gain Ki that serves as the integrator element. In one embodiment where the PWM signal generator 13b generates the PWM signal by means of the proportional (P) control, the gain K may be configured by the feedback gain Kp that serves as the proportional element.

The PWM signal generator 13b may include a gain table or a gain function in which the distance D and any gain are associated with each other, and derive any gain on the basis of the gain table or the gain function, for example. In one embodiment where the PWM signal generator 13b generates the PWM signal by means of the PI control, the PWM signal generator 13b may have a gain table 52A illustrated by way of example in FIG. 13 or a gain function in which the distance D and the gains (Kp and Ki) are associated with each other, for example. In such an embodiment, the PWM signal generator 13b may use the gain table 52A or the gain function to derive the gains (Kp and Ki).

FIG. 13 illustrates an example of the gain table 52A. The gain table 52A illustrated in FIG. 13 may include six sections as ranges of the distance D. The gains (Kp and Ki) may be defined for each of the sections. In an example case where a value of the distance D falls in a range between D3 and D4, the PWM signal generator 13b may extract gains Kp(3) and Ki(3) from the gain table 52A as the gains (Kp and Ki). It is to be noted that the number of sections provided in the gain table 52A is not limited to six.

The communicator 14 may perform communication with the communicator 25 of the power receiving apparatus 20 wirelessly, for example. The communicator 14 and the communicator 25 may communicate with each other by means of close-proximity wireless communication such as, but not limited to, Bluetooth (Registered Trademark) and any other suitable short-range wireless communication. The communicator 14 may wirelessly receive, from the power receiving apparatus 20, a result of detection performed by a detector, for example. The result of the detection may include detection results of the distance D and the current value Iload, for example.

A procedure for power feeding performed in the power feeding system 3 may be equivalent to the procedure illustrated by way of example in FIG. 5 in which the voltage value Vload is read as the distance D. Effects achieved by the power feeding system 3 may also be similar to those achieved by the power feeding system 1.

[Modification Examples Common to Each Embodiments]

Figure 14:
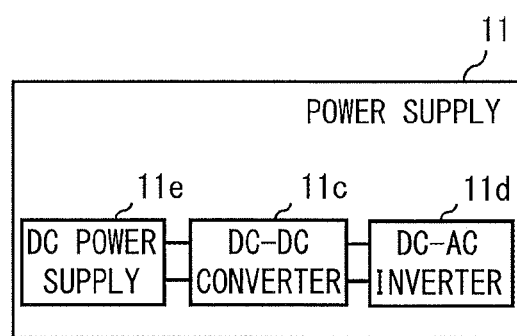
FIG. 14 illustrates an example of functional blocks of the power supply provided in the power feeding apparatus illustrated in any of FIGS. 1, 8, and 11.
Figure 15:
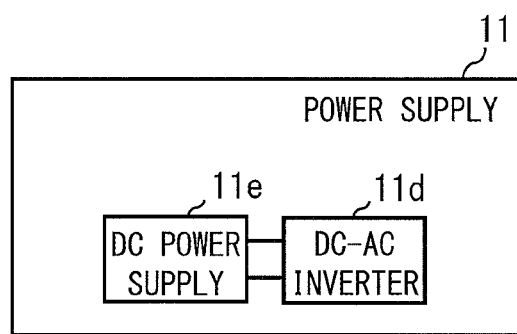
FIG. 15 illustrates an example of functional blocks of the power supply provided in the power feeding apparatus illustrated in FIG. 1 or FIG. 11.

In each of the foregoing embodiments, the power supply 11 may include a DC power supply 11e instead of the AC power supply 11a and the AC-DC converter 11b as illustrated by way of example in FIG. 14. The DC power supply 11e may output a direct-current signal. In addition, in each of the foregoing embodiments, the power supply 11 may include the DC power supply 11e instead of the AC power supply 11a and the AC-DC converter 11b, and may have no DC-DC converter 11c, as illustrated by way of example in FIG. 15. Moreover, in each of the foregoing embodiments and their modification examples, the power feeding system 1 may transmit, in a contactless fashion, the electric power from the power feeding apparatus 10 to the power receiving apparatus 20 by means of a scheme based on electromagnetic induction that is one example of the magnetic coupling.

Furthermore, the technology encompasses any possible combination of some or all of the various embodiments and the modifications described herein and incorporated herein.

Further, effects described herein are illustrative and non-limiting. Effects achieved by the technology may be those that are different from the above-described effects, or may include other effects in addition to those described above.

It is possible to achieve at least the following configurations from the above-described example embodiments of the disclosure.

(1) A power feeding apparatus in a power feeding system, the power feeding system being configured to transmit, in a contactless fashion, electric power from the power feeding apparatus to a power receiving apparatus to which a load is to be coupled, the electric power being transmitted by magnetic coupling, the power feeding apparatus including:
a power feeding resonator;
a power supply configured to output a high-frequency signal to the power feeding resonator;
a communicator configured to receive load information from the power receiving apparatus, the load information including information on at least a voltage between the voltage and a current of the load coupled to the power receiving apparatus; and
a controller configured to perform, on the power supply, a control of the high-frequency signal on a basis of the load information received by the communicator, after starting of the output of the high-frequency signal by the power supply.

(2) The power feeding apparatus according to (1), in which
the power supply includes a DC-AC inverter provided in an output stage of the power supply, and
the controller controls the high-frequency signal by generating, on a basis of a voltage value of the load and deviation, a PWM signal and outputting the generated PWM signal to the DC-AC inverter, the deviation being deviation between a target current value and a current value of the load.

(3) The power feeding apparatus according to (2), in which
the controller derives a gain that corresponds to the voltage value of the load, and generates the PWM signal on a basis of the derived gain and the deviation.

(4) The power feeding apparatus according to (1), in which
the power supply includes a DC-DC converter and a DC-AC inverter coupled to an output of the DC-DC converter, and
the controller controls the high-frequency signal by generating, on a basis of a voltage value of the load, a PWM signal and outputting the generated PWM signal to the DC-DC converter.

(5) The power feeding apparatus according to (4), in which
the controller generates the PWM signal to cause an output voltage of the DC-DC converter to follow a variation in the voltage value of the load.

(6) A power feeding apparatus in a power feeding system, the power feeding system being configured to transmit, in a contactless fashion, electric power from the power feeding apparatus to a power receiving apparatus to which a load is to be coupled, the electric power being transmitted by magnetic coupling, the power feeding apparatus including:
a power feeding resonator;
a power supply configured to output a high-frequency signal to the power feeding resonator;

a communicator configured to receive power-receiving-side information from the power receiving apparatus, the power-receiving-side information including information on a distance and information on a current of the load coupled to the power receiving apparatus, the distance being a distance between the power feeding apparatus and the power receiving apparatus and relating to the magnetic coupling; and a controller configured to perform, on the power supply, a control of the high-frequency signal on a basis of the power-receiving-side information received by the communicator, after starting of the output of the high-frequency signal by the power supply.

(7) The power feeding apparatus according to (6), in which
the power supply includes a DC-AC inverter provided in an output stage of the power supply, and
the controller controls the high-frequency signal by generating, on a basis of the distance and deviation, a PWM signal and outputting the generated PWM signal to the DC-AC inverter, the deviation being deviation between a target current value and a current value of the load.

(8) The power feeding apparatus according to (7), in which
the controller derives a gain that corresponds to the distance, and generates the PWM signal on a basis of the derived gain and the deviation.

(9) A power feeding system configured to transmit, in a contactless fashion, electric power by magnetic coupling, the power feeding system including:
a power feeding apparatus configured to transmit the electric power; and
a power receiving apparatus to which a load is to be coupled, and configured to receive the electric power transmitted from the power feeding apparatus,
the power receiving apparatus including
a power receiving resonator,
a detector configured to perform a detection of at least a voltage between the voltage and a current of the load coupled to the power receiving apparatus, and
a first communicator configured to transmit a result of the detection performed by the detector to the power feeding apparatus, and
the power feeding apparatus including
a power feeding resonator,
a power supply configured to output a high-frequency signal to the power feeding resonator,
a second communicator configured to receive the result of the detection from the first communicator, and
a controller configured to perform, on the power supply, a control of the high-frequency signal on a basis of the result of the detection received by the second communicator, after starting of the output of the high-frequency signal by the power supply.

(10) A power feeding system configured to transmit, in a contactless fashion, electric power by magnetic coupling, the power feeding system including:
a power feeding apparatus configured to transmit the electric power; and
a power receiving apparatus to which a load is to be coupled, and configured to receive the electric power transmitted from the power feeding apparatus,
the power receiving apparatus including
a power receiving resonator,
a current detector configured to perform a detection of a current of the load coupled to the power receiving apparatus, and
a first communicator configured to transmit a result of the detection performed by the current detector to the power feeding apparatus, and
the power feeding apparatus including
a power feeding resonator,
a power supply configured to output a high-frequency signal to the power feeding resonator,
a second communicator configured to receive the result of the detection from the first communicator,
a distance measuring device configured to measure a distance that is between the power feeding apparatus and the power receiving apparatus and relates to the magnetic coupling, and
a controller configured to perform, on the power supply, a control of the high-frequency signal on a basis of the distance obtained by the distance measuring device and the result of the detection received by the second communicator, after starting of the output of the high-frequency signal by the power supply.

In the power feeding apparatus according to (1) and the power feeding system according to (9), the control of the high-frequency signal on the basis of at least the voltage between the voltage and the current of the load is performed on the power supply, after starting of the output of the high-frequency signal by the power supply. Thus, a rush current is reduced.

In the power feeding apparatus according to (6) and the power feeding system according to (10), the control of the high-frequency signal is performed on the basis of the distance and the current of the load. Thus, a rush current is reduced.

According to the power feeding apparatus and the power feeding system of one embodiment of the technology, the control of the high-frequency signal on the basis of at least the voltage between the voltage and the current of the load is performed. Hence, it is possible to reduce a rush current while suppressing an increase in size of an apparatus and the rise in cost.

According to the power feeding apparatus and the power feeding system of one embodiment of the technology, the control of the high-frequency signal is performed on the basis of the distance and the current of the load. Hence, it is possible to reduce a rush current while suppressing an increase in size of an apparatus and the rise in cost.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "desirably" or the like is non-exclusive and means "preferably", but not limited to. The use of the terms first, second, etc. do not denote any order or importance, but rather the terms first, second, etc. are used to distinguish one element from another. Moreover, no element or component in this disclosure is intended to be dedicated to the public regardless of whether the element or component is explicitly recited in the following claims.

What is claimed is:

1. A power feeding apparatus in a power feeding system, the power feeding system being configured to transmit, in a contactless fashion, electric power from the power feeding apparatus to a power receiving apparatus to which a load is to be coupled, the electric power being transmitted by magnetic coupling, the power feeding apparatus comprising:
a power feeding resonator;
a power supply configured to output a high-frequency signal to the power feeding resonator;
a communicator configured to receive load information from the power receiving apparatus, the load information including a voltage of the load coupled to the power receiving apparatus; and
a controller configured to perform, on the power supply, a control of the high-frequency signal on a basis of the load information received by the communicator, after starting of the output of the high-frequency signal by the power supply, the controller including a PWM generator to generate a PWM signal to control the high-frequency signal by way of at least one of proportional, integral, or derivative control, the PWM generator storing a gain table correlating a plurality of measured load voltage value ranges with respective feedback gain values serving as proportional, integral, and/or derivative elements, the PWM generator selecting one or more feedback gains for controlling the high-frequency signal based on matching the received load voltage to one of the plurality of measured load voltage value ranges in the gain table.

2. The power feeding apparatus according to claim 1, wherein
the power supply includes a DC-AC inverter provided in an output stage of the power supply, and
the controller outputs the generated PWM signal to the DC-AC inverter.

3. The power feeding apparatus according to claim 1, wherein
the power supply includes a DC-DC converter and a DC-AC inverter coupled to an output of the DC-DC converter, and
the controller outputs the generated PWM signal to the DC-DC converter.

4. The power feeding apparatus according to claim 3, wherein the controller generates the PWM signal to cause an output voltage of the DC-DC converter to follow a variation in the voltage value of the load.

5. A power feeding apparatus in a power feeding system, the power feeding system being configured to transmit, in a contactless fashion, electric power from the power feeding apparatus to a power receiving apparatus to which a load is to be coupled, the electric power being transmitted by magnetic coupling, the power feeding apparatus comprising:
a power feeding resonator;
a power supply configured to output a high-frequency signal to the power feeding resonator;
a communicator configured to receive power-receiving-side information from the power receiving apparatus, the power-receiving-side information including information on a distance and information on a current of the load coupled to the power receiving apparatus, the distance being a distance between the power feeding apparatus and the power receiving apparatus and relating to the magnetic coupling; and
a controller configured to perform, on the power supply, a control of the high-frequency signal on a basis of the power-receiving-side information received by the communicator, after starting of the output of the high-frequency signal by the power supply, the controller including a PWM generator to generate a PWM signal to control the high-frequency signal by way of at least one of proportional, integral, or derivative control, the PWM generator storing a gain table correlating a plurality of distance ranges with respective feedback gain values serving as proportional, integral, and/or derivative elements, the PWM generator selecting one or more feedback gains for controlling the high-frequency signal based on matching the received distance between the power feeding apparatus and the power receiving apparatus to one of the plurality of distance ranges in the gain table.

6. The power feeding apparatus according to claim 5, wherein the power supply includes a DC-AC inverter provided in an output stage of the power supply, and the controller outputs the generated PWM signal to the DC-AC inverter.

7. A power feeding system configured to transmit, in a contactless fashion, electric power by magnetic coupling, the power feeding system comprising:
a power feeding apparatus configured to transmit the electric power; and
a power receiving apparatus to which a load is to be coupled, and configured to receive the electric power transmitted from the power feeding apparatus,
the power receiving apparatus including
a power receiving resonator,
a detector configured to perform a detection of a voltage of the load coupled to the power receiving apparatus, and
a first communicator configured to transmit a result of the detection performed by the detector to the power feeding apparatus, and
the power feeding apparatus including
a power feeding resonator,
a power supply configured to output a high-frequency signal to the power feeding resonator,
a second communicator configured to receive the result of the detection from the first communicator, and
a controller configured to perform, on the power supply, a control of the high-frequency signal on a basis of the result of the detection received by the second communicator, after starting of the output of the high-frequency signal by the power supply, the controller including a PWM generator to generate a PWM signal to control the high-frequency signal by way of at least one of proportional, integral, or derivative control, the PWM generator storing a gain table correlating a plurality of measured load voltage value ranges with respective feedback gain values serving as proportional, integral, and/or derivative elements, the PWM generator selecting one or more feedback gains for controlling the high-frequency signal based on matching the received load voltage to one of the plurality of measured load voltage value ranges in the gain table, the controller including a PWM generator to generate a PWM signal to control the high-frequency signal by way of at least one of proportional, integral, or derivative control, the PWM generator storing a gain table correlating a plurality of distance ranges with respective feedback gain values serving as proportional, integral, and/or derivative elements, the PWM generator selecting one or more feedback gains for controlling the high-frequency signal based on matching the measured distance between the power feeding apparatus and the power receiving apparatus to one of the plurality of distance ranges in the gain table.

8. A power feeding system configured to transmit, in a contactless fashion, electric power by magnetic coupling, the power feeding system comprising:
- a power feeding apparatus configured to transmit the electric power; and
- a power receiving apparatus to which a load is to be coupled, and configured to receive the electric power transmitted from the power feeding apparatus,
- the power receiving apparatus including
  - a power receiving resonator,
  - a current detector configured to perform a detection of a current of the load coupled to the power receiving apparatus, and
  - a first communicator configured to transmit a result of the detection performed by the current detector to the power feeding apparatus, and
- the power feeding apparatus including
  - a power feeding resonator,
  - a power supply configured to output a high-frequency signal to the power feeding resonator,
  - a second communicator configured to receive the result of the detection from the first communicator,
  - a distance measuring device configured to measure a distance that is between the power feeding apparatus and the power receiving apparatus and relates to the magnetic coupling, and
  - a controller configured to perform, on the power supply, a control of the high-frequency signal on a basis of the distance obtained by the distance measuring device and the result of the detection received by the second communicator, after starting of the output of the high-frequency signal by the power supply.

\* \* \* \* \*